June 11, 1935.  W. P. MARTIN  2,004,704
GRINDING MILL
Filed Jan. 18, 1932
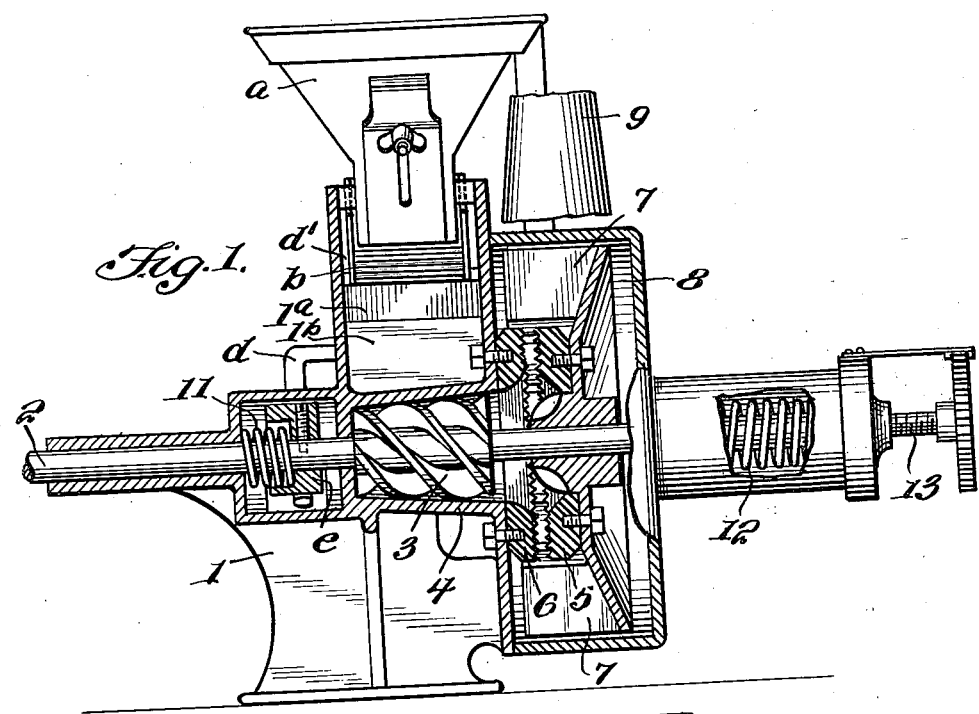
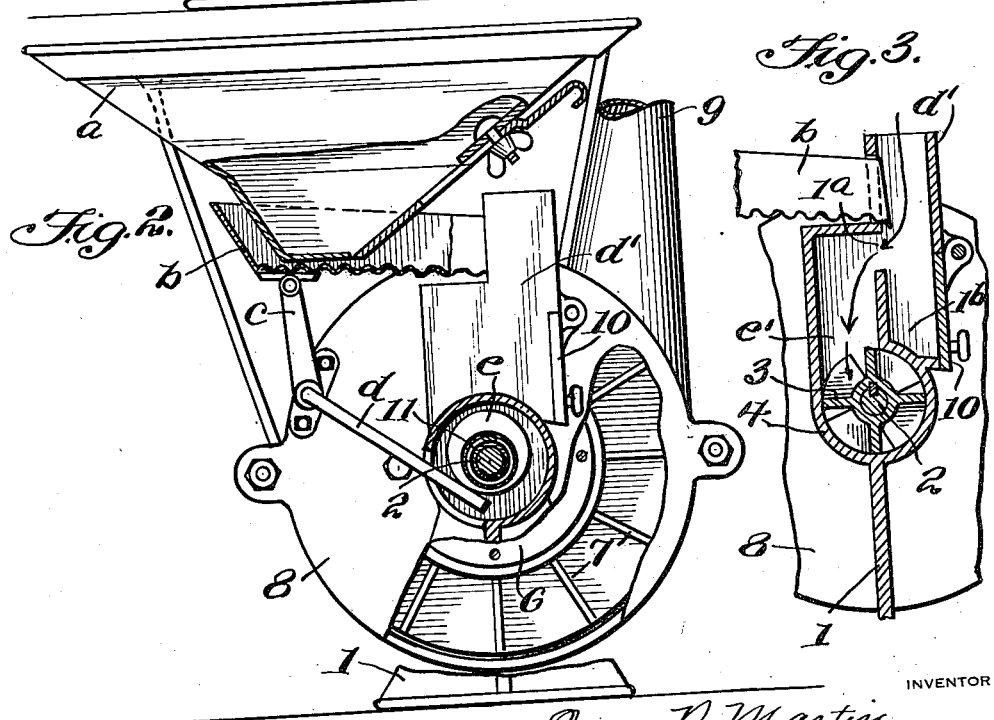
INVENTOR
Wayne P. Martin
BY Spear, Donaldson & Hall ATTORNEYS Patented June 11, 1935

2,004,704

UNITED STATES PATENT OFFICE 2,004,704

GRINDING MILL

Wayne P. Martin, Anoka, Minn.

Application January 18, 1932, Serial No. 587,419

2 Claims. (Cl. 83—8)

The invention concerns a grinding mill adapted to be run at a high speed having means associated therewith whereby the material to be ground is subject to a current of air while it is being fed to the mill, and after it is ground, provision being made for separating the light grain from the heavier foreign matter such as iron and stone, which latter is carried by gravity to a point of discharge so that only light grain will be conducted to the grinding elements, and after having been ground the material still subject to the current of air will be discharged to any desired elevated point.

In carrying out this invention a suction fan is directly associated with the revolving burr to create such a suction as will draw the material into the mill from a source of supply, the lighter grain being separated by this suction from heavier foreign matter so that only the grain will be drawn into the mill.

In the accompanying drawing

Figure 1 is a longitudinal sectional view taken vertically through the mill, some of the parts being shown in elevation.

Figure 2 is a view of Figure 1 looking from the left thereof with some of the parts in section and broken away.

Fig. 3 is a view in section through the feed casing.

In the drawing, 1 indicates the frame of the machine in which is mounted the shaft 2 which carries a conveyor 3 of screw form, said conveyor being located in a casing 4. The shaft also carries a grinding burr 5 cooperating with a companion burr 6. The hub of the burr 5 carries fan blades 7 which operate within a casing 8. From this casing a discharge pipe 9 extends for conveying the ground material to any suitable point of discharge. This point may be elevated in respect to the blower 7, 8 so that the ground material can be discharged to any desired point. The material to be ground is fed from a hopper $a$ together with such foreign matter as the grain may contain and from this hopper the material passes into a shaker pan $b$ which may be operated in any suitable manner by a connection $c$, $d$ from a cam member $e$ mounted on the shaft 2. From the shaker pan $b$ the material with any contained foreign matter passes into a casing $d$ which by a lateral opening $1a$ communicates with a chamber $e$ which communicates with the casing $f$ of the screw conveyor 3. The chamber $d$ extends below the lateral port $1a$ as shown at $1b$ and the lower portion of this chamber $d$ is provided with a door 10 for the discharge of foreign matter.

In the operation of the mill, the blower will create suction past the burrs and screw conveyor and through the chamber $d$ so that the lighter grain will be drawn to the conveyor and the burrs through the lateral opening $1a$ while the heavy foreign matter will be deposited at the lower end $1b$ of the chamber $d$ for its discharge through the door 10. The blower rotates at a high rate of speed, say 4,000 R. P. M. and this speed is desired in order to obtain sufficient vacuum for the separation of the grain from the foreign matter and also to provide pressure to elevate the ground grain to the desired height.

A spring is provided at 11 bearing at one end upon the casing and at its other end upon the cam member or abutment $e$. This spring will act to keep the burrs from rubbing together when running empty. The blower which is built around the revolving burr 5 is made an integral part of the hub to which the revolving burr is bolted. The housing of the burrs is so made to conform to the shape of the blower as to efficiently carry the ground grain to the discharge opening 9.

From the above described construction it will be noticed that the grain having been ground is elevated by a portion of the assembly described without the use of a separate machine.

Owing to the fact that suction is placed upon the grain as it is subjected to the grinding process the capacity of the apparatus is greatly increased over mills which rely entirely upon gravity and the screw conveyor. Therefore, the present grinding mill organization involving as it does the use of a suction fan gives increased capacity for the same size grinding burrs as compared with assemblies not including the arrangement of the suction fan disclosed herein.

At 12 I show one of two safety springs which protect the grinding plates or burrs from excessive tension from the adjusting screw 13. The shaker pan $b$ moves with a rocking motion and the cam which is employed for giving this motion also serves the purpose of a collar to carry the end thrust of the spring 11.

It will be noticed from Figure 2 that the auger or conveyor 3 revolves in an anti-clockwise direction and that the top half of the conveyor which is on the rising side thereof is completely covered so that the feed of the grain takes place on that side of the conveyor which is moving downward. In other words the direction of the feed of the material to the conveyor corresponds with the general direction in which that part of the conveyor is moving which receives the grain thereupon. This arrangement facilitates the employment of a high speed of revolution of the conveyor and burrs.

I claim:

1. The combination in a grinding mill of a casing having inlet and discharge openings, a worm conveyor within the casing adjacent the inlet opening, a chamber communicating with the inlet opening, a second chamber partially enclosing the said conveyor and separated from the first named chamber by a vertical partition, said partition being apertured at its upper portion to provide a communication between the two chambers, cooperating grinding burrs, and a fan for inducing a current of air from the inlet opening to and through the aperture in the partition, the conveyor and the grinding burrs, whereby the light material will be drawn through the aperture in the partition and be fed to the worm conveyor, and the heavy foreign material will fall beyond the aperture into the first named chamber, said second chamber inclosing that portion of the conveyor moving in a direction counter to the flow of material, whereby the material will be fed to the side of the conveyor moving in the direction of travel of the material.

2. The combination in a grinding mill of a casing having an inlet and discharge openings, a worm conveyor rotatably mounted within the casing, a chamber communicating with the inlet opening, a second chamber communicating with said conveyor, a vertical wall common to and separating said chambers, said wall being apertured at its upper portion to provide a passageway between the two chambers, cooperating grinding elements at the delivery end of said conveyor, one of which is rotatable, a plurality of fan blades carried by the rotatable grinding element radially beyond the delivery opening from between the grinding elements, said fan blades delivering ground material out of said discharge opening and inducing a draft between the grinding elements and through said aperture in the dividing wall from the inlet opening, the draft through said aperture carrying with it the lighter material to be fed to the conveyor, while the heavier foreign material falls beyond the aperture into the first named chamber.

WAYNE P. MARTIN.